United States Patent [19]
Buckshaw et al.

[11] Patent Number: 5,516,063
[45] Date of Patent: May 14, 1996

[54] BOILER TUBE CLAMP ASSEMBLY

[76] Inventors: Dennis J. Buckshaw, 42240 Crestview, Northville, Mich. 48167; James A. Clark, 7309 Manner Cir. #202, Westland, Mich. 48185

[21] Appl. No.: 206,951

[22] Filed: Mar. 7, 1994

[51] Int. Cl.⁶ ........................................ F16L 3/22
[52] U.S. Cl. ............... 248/68.1; 248/49; 211/60.1
[58] Field of Search ............... 248/68.1, 49, 69, 248/67.7, 74.4; 211/60.1

[56] References Cited

U.S. PATENT DOCUMENTS

| | | | |
|---|---|---|---|
| 2,354,919 | 8/1944 | Lockwood | 248/68.1 |
| 2,665,867 | 1/1951 | McDonald | 248/68 |
| 4,184,862 | 1/1980 | Waters | 248/68.1 |
| 4,431,152 | 2/1984 | Reed, Jr. | 248/68.1 |
| 4,706,822 | 11/1987 | Remp, Jr. et al. | 211/60.1 |
| 4,858,861 | 8/1989 | Wilkinson, III | 248/74.1 |
| 5,029,782 | 7/1991 | Andre et al. | 248/68.1 |
| 5,083,372 | 1/1992 | Polutnik et al. | 29/890.043 |
| 5,123,547 | 6/1992 | Koch | 211/60.1 |

*Primary Examiner*—Karen J. Chotkowski
*Assistant Examiner*—Anita M. King
*Attorney, Agent, or Firm*—Young & Basile

[57] ABSTRACT

A boiler tube clamp assembly and a method of forming the clamp assembly. The clamp assembly includes two identical elongated clamp halves which coact in their assembled relation to define a series of axially spaced openings to pass respective tubes and further define first and second passages extending axially along the respective side edges of the assembled clamp halves. The assembly further includes first and second locking rods respectively slidably received in the first and second passages and acting to maintain the clamp halves in their assembled relation. Each clamp half includes an axially spaced series of first slots opening in one side edge of the clamp half with a series of first land portions positioned respectively between the slots and further includes a series of second axially spaced slots opening the other side edge of the clamp half with a series of second land portions positioned respectively therebetween. The clamp halves are positioned in superimposed relation with the first land portions of one clamp half received in the second slots in the other clamp half, the first land portions of the other clamp half received in the second slots of the one clamp half, the first slots in the clamp halves coacting to define a series of axially spaced openings sized to pass the tubes, and the internested land portions coacting to define the first and second passages along longitudinal side edges of the clamp assembly for slidable receipt of the first and second rods.

16 Claims, 4 Drawing Sheets

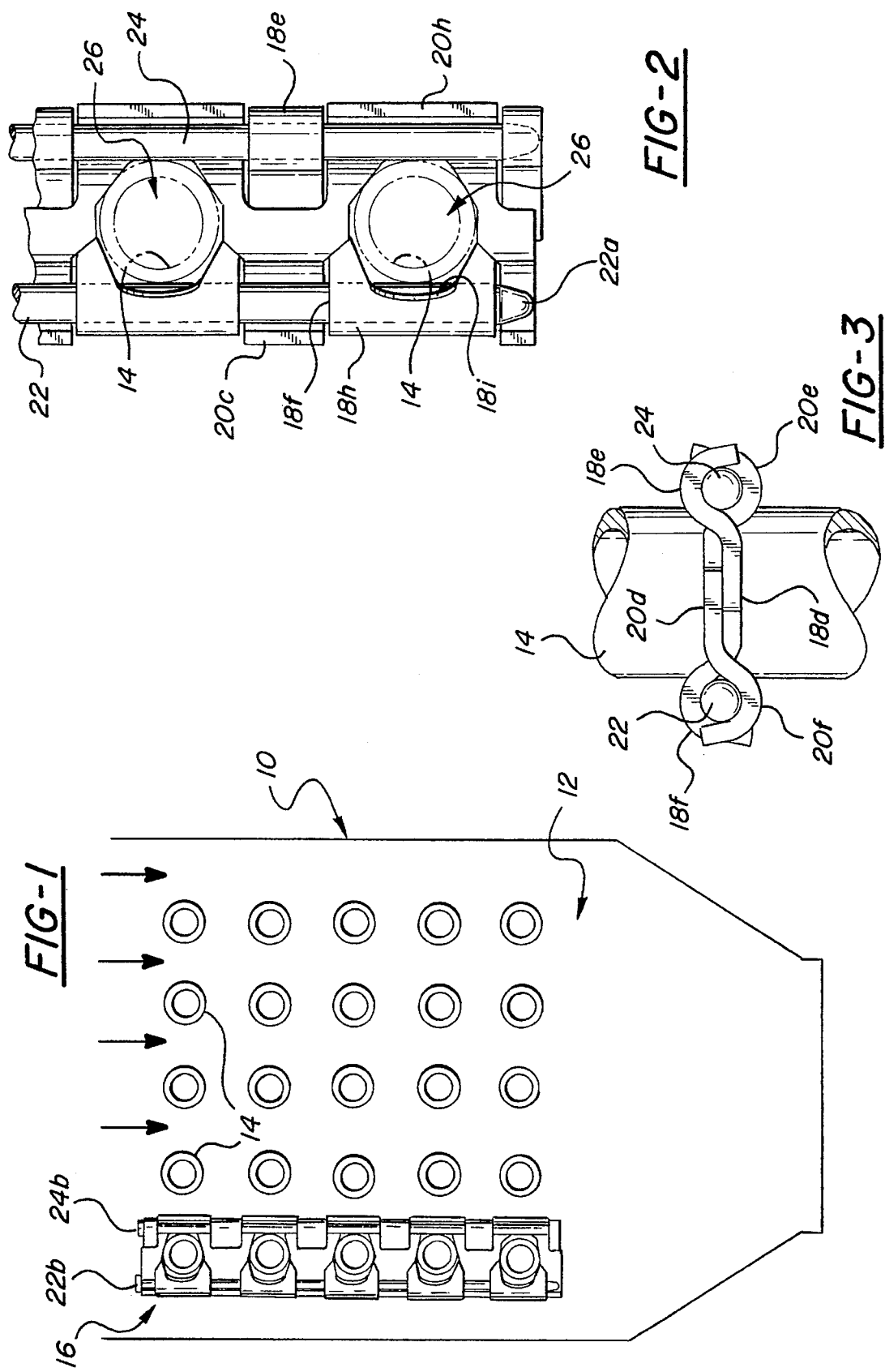

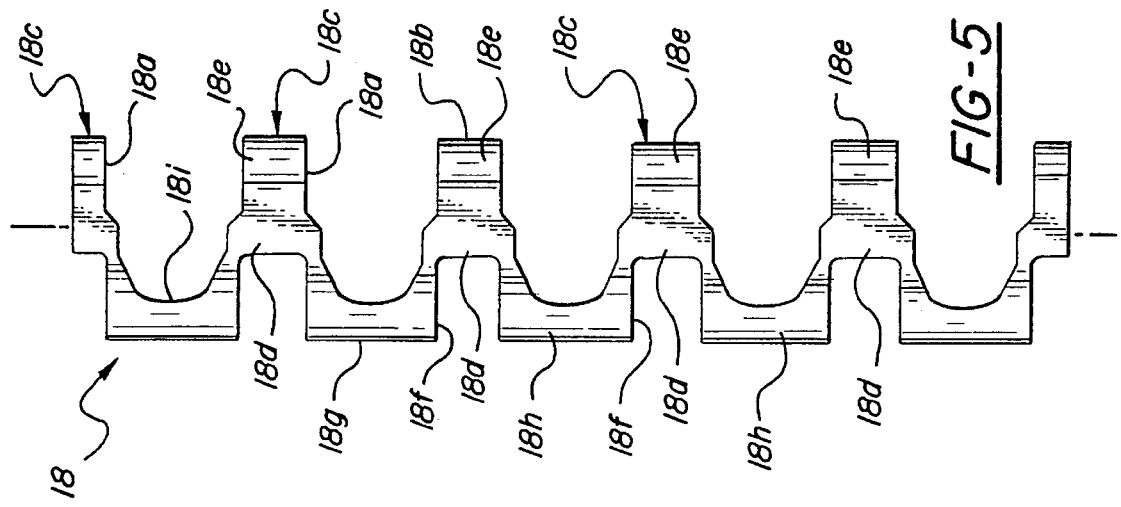
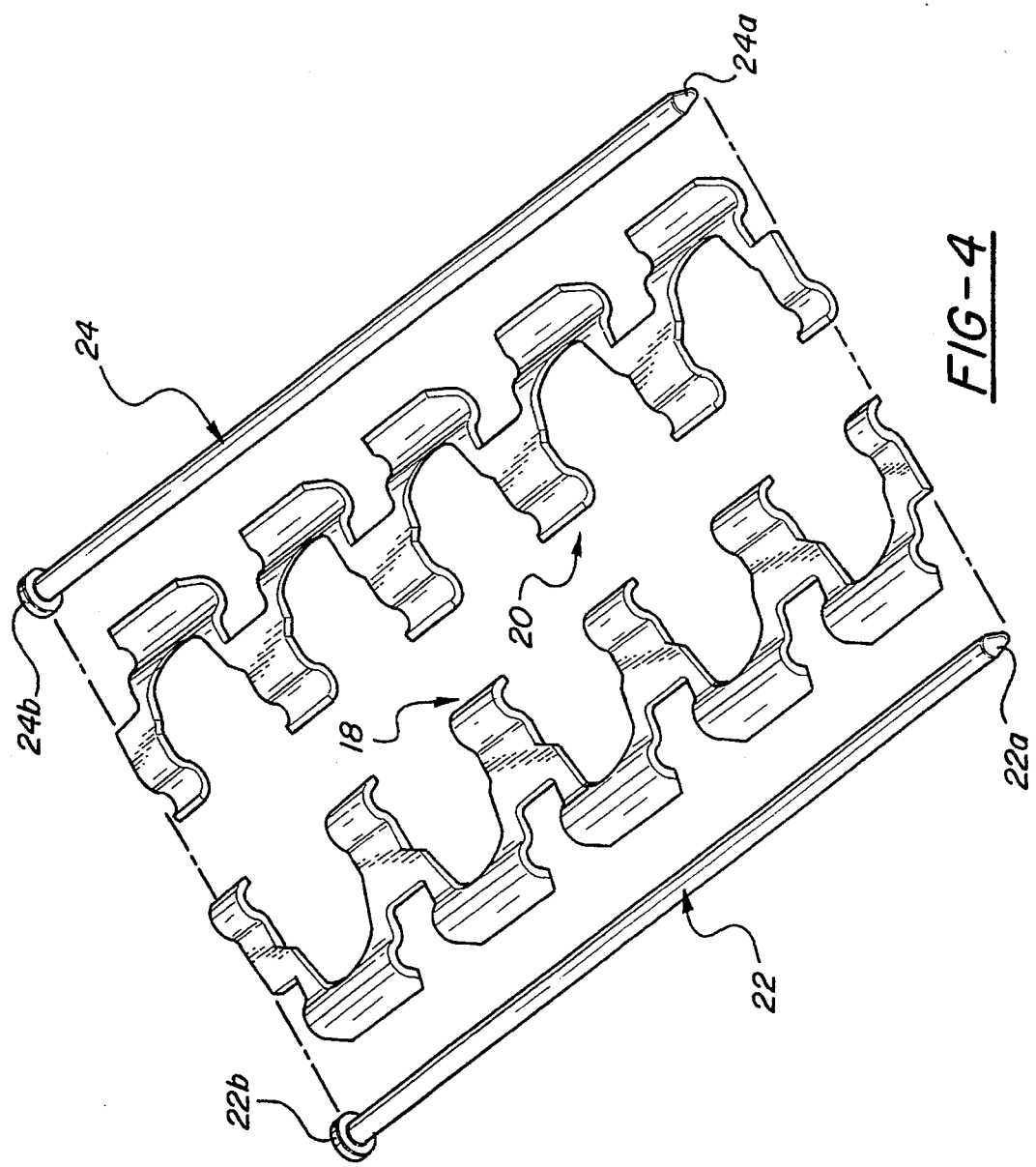

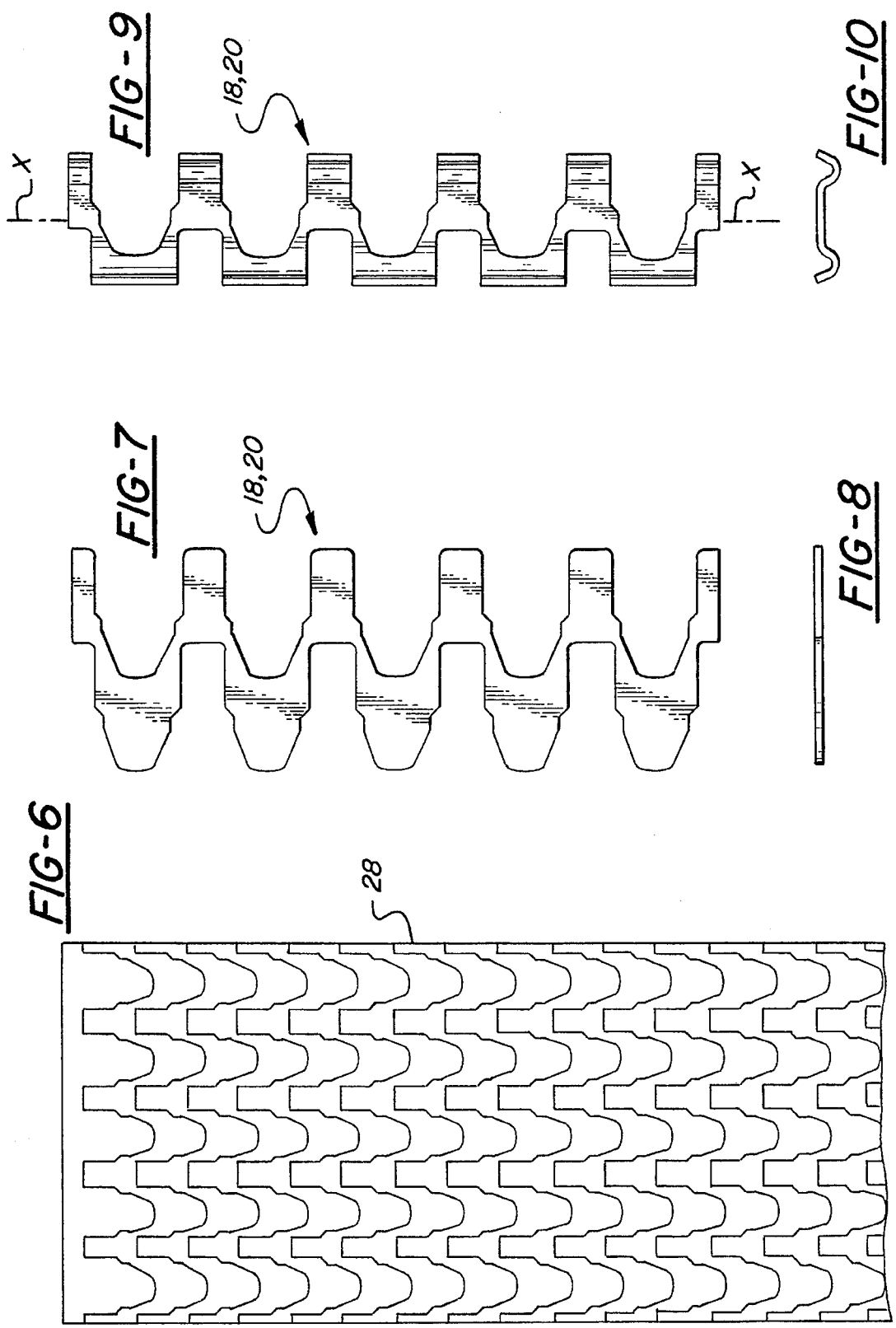

BOILER TUBE CLAMP ASSEMBLY

BACKGROUND OF THE INVENTION

This invention relates to clamp assemblies and more particularly to a clamp assembly that is especially suitable for maintaining a series of boiler tubes in parallel relation.

Tubes are in common use in various heat exchanger apparatuses such for example as boilers and condensers. The tubes typically are arranged in rows and it is important that the individual tubes in each row be maintained in parallel spaced relation. Various clamp assemblies, tube alignment bars, and the like have been proposed to maintain the tubes in their parallel spaced relation but the prior art mechanisms are expensive to manufacture and/or expensive to install and/or expensive to maintain.

SUMMARY OF THE INVENTION

This invention is directed to the provision of an improved clamp assembly especially suitable for use in maintaining boiler tubes in parallel spaced relation.

The invention clamp assembly includes a pair of clamp halves adapted to coact to maintain a series of tubes in parallel spaced relation. The assembly is characterized in that the clamp halves coact in their assembled relation to define a series of axially spaced openings to pass respective tubes and first and second passages extending axially along the respective sides of the respective clamp halves, and the clamp assembly further includes first and second locking rods respectively received in the first and second passages. This arrangement allows the clamp assembly to be readily assembled and disassembled with respect to a series of tubes with a minimum of labor and a minimum of time.

According to a further feature of the invention, each clamp half includes a series of axially spaced planar main body portions separated by a series of first axially spaced slots opening in one side edge of the clamp half and, in the assembled relation of the clamp halves, the planar main body portions of one clamp half are superimposed on the planar main body portions of the other clamp half and the first slots in one clamp half coact with the first slots in the other clamp half to define the openings for passage of the tubes. This arrangement facilitates the assembly of the clamp halves to provide the required openings for passage of the tubes.

According to a further feature of the invention, each clamp half further includes a series of axially spaced first passage defining portions proximate the one side edge, raised above the plane of the planar main body portions, and formed as lateral extensions of the respective planar main body portion; a series of second axially spaced slots opening in the other side edge of the clamp half in respective lateral alignment with the planar main body portion; and a series of axially spaced second passage defining portions proximate the other side edge, raised above the plane of the planar main body portions, and disposed in respective lateral alignment with the first slots. This arrangement allows the clamp halves to be internested in their assembled relation to define the tube openings and the passages for receipt of the rods.

In the disclosed embodiment of the invention, the first passage defining portions of one clamp half underlie the first rod, the second passage defining portions of the other clamp half overlie the first rod, the first passage defining portions of the other clamp half overlie the second rod, and the second passage defining portions of the one clamp half underlie the second rod. This arrangement allows the clamp defining portions of the first and second halves to engage opposite surfaces of the rod so that the rods act to lock the clamp halves in their assembled relation.

The invention also provides a method of forming a clamp assembly adapted to embrace a series of tubes to maintain the tubes in parallel spaced relation. According to the invention method, a pair of identical elongated clamp halves are formed each having a series of axially spaced first slots opening in one longitudinal side edge of the clamp half with a series of axially spaced land portions positioned respectively therebetween and each having a series of second axially spaced slots opening in the other longitudinal side edge of the clamp half with a series of second axially spaced land portions positioned respectively therebetween; one of the clamp halves is rotated with respect to the other clamp half about the lengthwise axis of the clamp halves and the clamp halves are moved together to position the first land portions of the one clamp half in the second slots of the other clamp half, position the second land portions of the other clamp half in the first slots of the other clamp half, position the first land portions of the other clamp half in the second slots of the first clamp half, position the second land portions of the other clamp half in the first slots of the one clamp half, and arrange the first and second slots in axially spaced pairs with each pair coacting to define an opening to pass a respective tube. This methodology allows inexpensive, readily manufacturable identical clamp halves to be utilized to form the clamp assembly.

According to a further aspect of the invention methodology, the first land portions of the one clamp half and the second land portions of the other clamp half coact to define a first passage extending axially along one longitudinal side edge of the clamp assembly; the first land portions of the other clamp half and the second land portions of the one clamp half coact to define a second passage extending axially along the other longitudinal side edge of the clamp assembly; and the method includes the further steps of providing first and second locking rods and inserting the first and second rods into the first and second passages. This methodology allows the simple, identical clamp halves to coact to define the first and second passages for receipt of the first and second rods.

BRIEF DESCRIPTION OF THE DRAWINGS

FIG. 1 is a view of a boiler employing tubes arranged in parallel rows and further illustrating an invention clamp assembly associated with the tubes;

FIG. 2 is a fragmentary side view of the invention clamp assembly;

FIG. 3 is an end view of the invention clamp assembly;

FIG. 4 is an exploded prospective view of the invention clamp assembly;

FIG. 5 is a view of a clamp half employed in the invention clamp assembly; and

FIGS. 6–14 are views illustrating the invention methodology.

DETAILED DESCRIPTION OF THE PREFERRED EMBODIMENT

Figure 11:
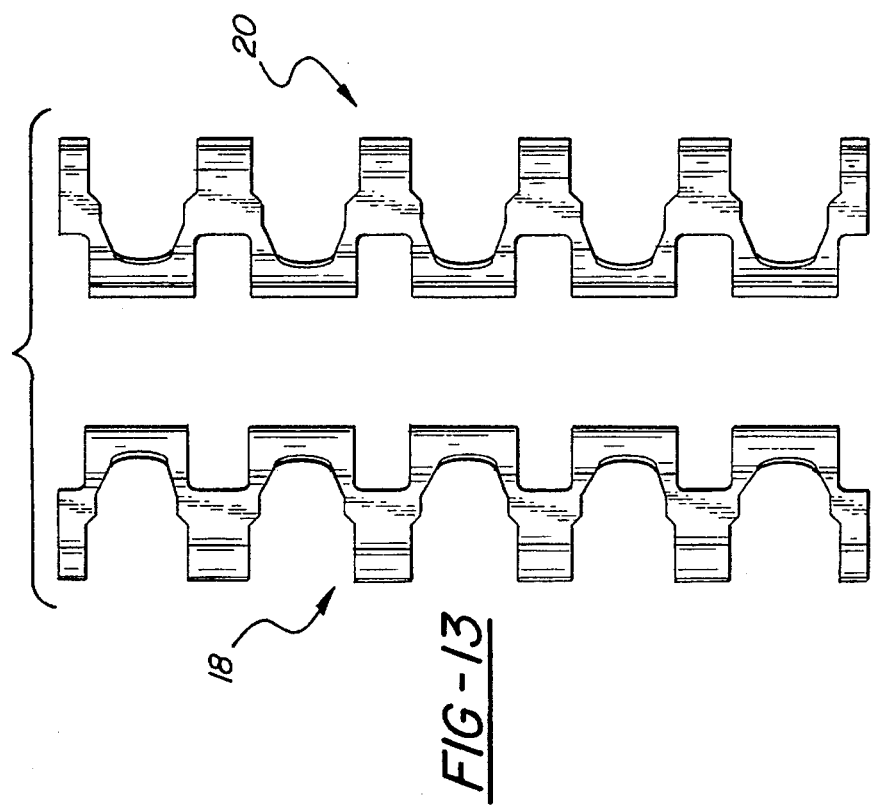

The apparatus illustrated in FIG. 1 may form a portion of a boiler or condenser and includes a housing 10 defining a chamber 12 within which vertical rows of tubes 14 are suitably positioned. A clamp assembly 16 according to the invention is shown in assembled relation with respect to a vertical row of tubes. Although a clamp assembly 16 is shown in association with only one vertical row of tubes it will be understood that, in a typical installation, a clamp assembly 16 will be utilized in association with each vertical row of tubes.

Clamp assembly 16 includes a first clamp half 18, a second clamp half 20, a first locking rod 22, and a second locking rod 24.

Clamp halves 18 and 20 are identical and rods 22 and 24 are also identical.

Clamp half 18 is formed as a single piece ferrous or other alloy stamping or casting and includes an axially spaced series of first slots 18a opening in one side edge 18b of the clamp half with a series of first land portions 18c positioned respectively between the slots 18a. Each of the land portions 18c includes an inboard planar main body portion 18d and an outboard first passage defining portion 18e.

Clamp half 18 further includes a series of second axially spaced slots 18f opening in the other side edge 18g of the clamp half with a series of second land portions 18h positioned between slots 18f. Each land portion 18h comprises a second passage defining portion. First and second passage defining portions 18e and 18h have an arcuate configuration in cross section and are raised above the plane of the planar main body portions 18d. Land portions 18c will be seen to be laterally aligned with slots 18f and land portions 18h will be seen to be laterally aligned with slots 18a. The outboard portions of slots 18a, as bounded by passage defining portions 18e, have a size and configuration generally corresponding to, but slightly larger than, passage defining portions 18h and slots 18f have a size and configuration generally corresponding to, but slightly larger than, passage defining portions 18e.

Clamp half 20 is identical to clamp half 18 and including slots, edges, and portions $20_a$–$20_h$ identical to the respective slots, edges, and portions $18_a$–$18_h$.

Each locking rod 22,24 has a circular cross sectional configuration and has an axial length generally corresponding to the axial length of clamp halves 18 and 20. Rods 22 and 24 may be formed for example of a suitable ferrous material or other alloy and each includes a conical pilot portion 22a/24a on one end and an enlarged head portion 22b/24b on the other end.

The clamp halves are assembled with clamp half 20 inverted with respect to clamp half 18. In their assembled relation, the planar main body portions 20d of clamp half 20 overlie the planar main body portions 18d of clamp half 18; the passage defining portions 18e of clamp half 18 are positioned in the slots 20f of clamp half 20; the passage defining portions 20c of clamp half 20 are positioned in the slots 18f of clamp half 18; passage defining portions 20c and 18h coact to define a first passage extending along one longitudinal side edge of the clamp assembly; passage defining portions 18e and 20h coact to define a second passage extending along the other axial longitudinal edge of the clamp assembly; rods 22 and 24 are respectively slidably received in the first and second passages defined along the opposite side edges of the clamp assembly; and the arcuate inboard ends 18i of slots 18a coact with the arcuate inboard ends 20i of slots 20a to define a series of axially spaced generally circular openings 26 sized to loosely and respectively pass a series of boiler tubes 14.

It will be seen that the passage defining portions 18h overlie rod 22, the passage defining portions 20c underlie rod 22, the passage defining portions 18e overlie rod 24, and the passage defining portions 20h underlie rod 24 so that each passage is defined by a series of alternately overlying and underlying clamp portions coacting to define the respective passage. Locking rod 22, 24 thus coacts with the passage defining portions of the clamp halves to maintain the clamp halves in their assembled, superimposed relation.

In the use of the invention clamp assembly in association with boiler tubes 14, and following the inversion of one clamp half relative to the other clamp half, the clamp halves may be brought together to define the series of openings 26 to respectively receive the boiler tubes 14 and to define the first and second axially extending passages along the side edges of the assembled clamp halves, whereafter the locking rods 22 and 24 may be inserted into the passages to complete the clamp assembly and maintain the clamp halves in their assembled relation with respect to the tubes. Pilot portions 22a/24a facilitate the insertion of the rods and enlarged head portions 22b/24b define the limit of insertion of the rods and prevent the rods from falling out of the assembled clamp halves. When it is desired to remove the clamp assembly for replacement or repair, it is simply necessary to remove the locking rods 22 and 24 and then separate the clamp halves laterally.

Figure 12:
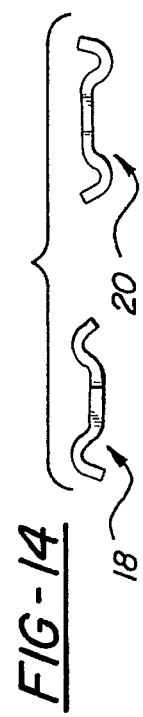
Figure 13:
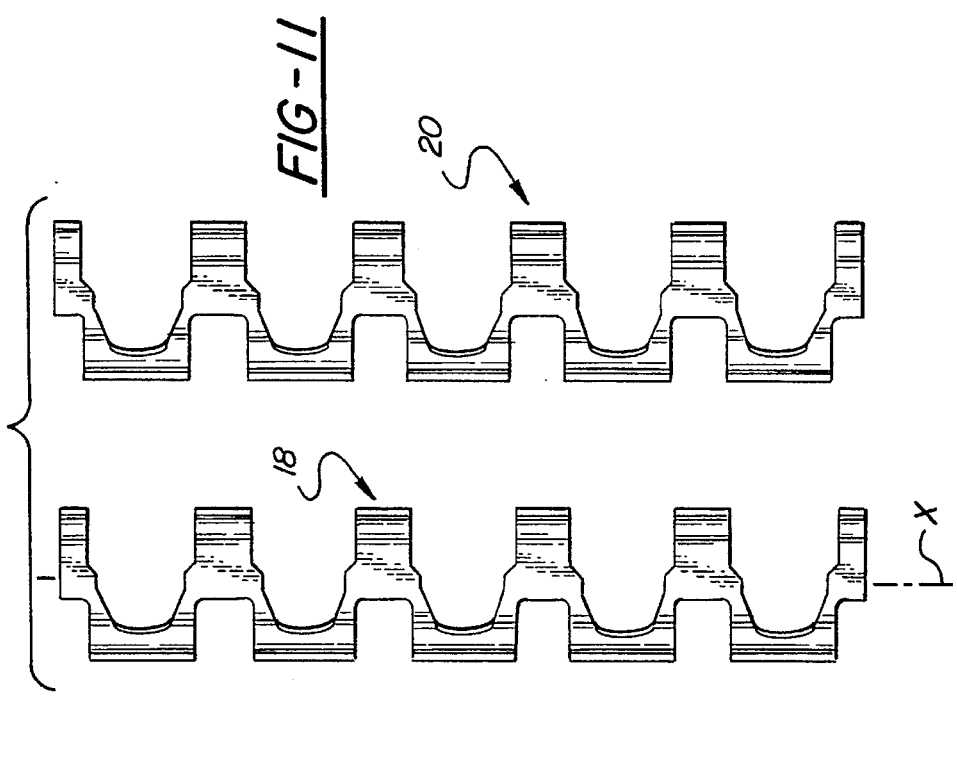
Figure 14:

The invention method of forming the invention clamp assembly is shown in FIGS. 6–14.

As seen in FIG. 6, a plurality of clamp halves 18/20 may be stamped from a flat elongated sheet of ferrous material 28 with virtually all the material of the sheet being utilized. A flat clamp half 18/20 thus formed is seen in FIGS. 7 and 8. The clamp halves are thereafter cold or hot formed to form the final clamp half 18/20 seen in FIGS. 9 and 10 wherein the planar main body portions of the clamp halves and the raised arcuate passage defining portions have been formed.

A pair of clamp halves 18 and 20 (as seen in side by side relation in FIG. 10 and as seen in cross section in FIG. 11) are now provided to form the clamp assembly. Clamp 18 is now rotated 180 about its lengthwise axis to assume the position relative to the clamp half 20 seen in FIGS. 13 and 14. The clamp halves are now laterally brought together in the manner previously described to position the respective main body portions in overlying relation to each other and to position the passage defining portions within the respective slots of the respective clamp halves to define the first and second axially extending passages, whereafter rods 22 and 24 are inserted to complete the clamp assembly and maintain the clamp halves in their superimposed, assembled relation.

The invention clamp assembly will be seen to provide many important advantages. Specifically, the clamp assembly is inexpensively manufacturable; may be readily installed in surrounding relation to the associated tubes with a minimum of dexterity and a minimum of time; and may be readily removed from the tubes for replacement or repair with a minimum of dexterity and a minimum of time.

Whereas a preferred embodiment of the invention has been illustrated and described in detail, it will be apparent that various changes may be made in the disclosed embodiment without departing from the scope or spirit of the invention.

We claim:

1. A clamp assembly including a pair of clamp halves adapted to coact to maintain a series of tubes in parallel spaced relation, characterized in that:

each clamp half is elongated and extends axially;

the clamp halves coact in their assembled relation to define generally parallel axially extending first and second clamp assembly sides, a row of axially spaced tube openings between and generally parallel to the first and second sides to pass respective tubes, and first and second passages extending axially along the respective first and second sides of the assembled clamp halves; and the clamp assembly further includes first and second rods respectively received in said first and second passages.

2. A clamp assembly according to claim 1 wherein:
the clamp halves are identical and are assembled with one clamp half inverted with respect to the other clamp half.

3. A clamp assembly according to claim 1 wherein:
the clamp halves are identical and are assembled with one clamp half rotated about its lengthwise axis through 180° with respect to the other clamp half.

4. A clamp assembly according to claim 2 wherein:
each clamp half includes a series of axially spaced planar main body portions separated by a series of first axially spaced slots opening in one side edge of the clamp half; and in the assembled relation of the clamp halves, the planar main body portions of one clamp half are superimposed on the planar main body portions of the other clamp half and the first slots in one clamp half coact with the first slots in the other clamp half to define the openings for passage of the tubes.

5. A clamp assembly adapted to embrace a series of tubes and maintain the tubes in parallel spaced relation, said assembly comprising:

first and second elongated clamp halves each having an axially spaced series of first slots opening in a first side edge of the clamp half with a series of first land portions positioned respectively therebetween and each having a series of second axially spaced slots opening in a second side edge of the clamp half with a series of second land portions positioned respectively therebetween;

the clamp halves being positioned in superimposed relation with the first land portions of said first clamp half received in the second slots in said second clamp half and the first land portions of said second clamp half received in the second slots of said first clamp half;

the first slots being dimensioned such that each first slot of said first clamp half coacts with a respective first slot of said second clamp half to define a series of axially spaced openings sized to pass the tubes;

the first land portions of said first clamp half coacting with the second land portions of said second clamp half to define a first axially extending passage along a first longitudinal side edge of the clamp assembly and the second land portions of said first clamp half coacting with the first land portions of said second clamp half to define a second axially extending passage along a second longitudinal side edge of the clamp assembly; and the clamp assembly further including first and second rods respectively slidably received in said first and second passages.

6. A clamp assembly according to claim 5 wherein:
each of said first land portions includes an inboard planar main body portion and an outboard first passage defining portion; and the planar main body portions of said first land portions of said first clamp half are positioned in superimposed relation to the planar main body portions of said first land portions of said second clamp half.

7. A clamp assembly according to claim 6 wherein:
each of said second land portions comprises a second passage defining portion;

in the assembled relation of the clamp halves and rods, the first passage defining portions of said first clamp half underlie said first rod, the second passage defining portions of said second clamp half overlie said first rod, the first passage defining portions of said second clamp half overlie said second rod, and the second passage defining portions of said first clamp half underlie said second rod.

8. A clamp assembly adapted to maintain a plurality of tubes in parallel spaced relation, said clamp assembly comprising:

first and second elongated clamp halves;

each clamp half having a series of axially spaced first slots opening in a first longitudinal side edge thereof separated by a corresponding series of axially spaced first land portions;

each clamp half having a series of axially spaced second slots opening in a second longitudinal side edge thereof separated by a corresponding series of axially spaced second land portions;

said first slots being axially staggered with respect to said second slots so that said first slots are laterally aligned with said second land portions and said second slots are laterally aligned with said first land portions;

said clamp halves being positioned in superimposed relation with outboard portions of said first land portions of said first clamp half positioned in said second slots of said second clamp half, said second land portions of said first clamp half positioned in said first slots of said second clamp half, inboard portions of said first slots of said first and second clamp halves coacting to define an axially spaced series of openings to respectively pass the tubes, outboard portions of the first land portions of said first clamp half coacting with the second land portions of said second clamp half to define a first passage extending along a first longitudinal side edge of the assembled clamp halves, and outboard portions of the first land portions of said second clamp half coacting with the second land portions of said second clamp half to define a second passage extending along a second longitudinal side edge of the assembled clamp halves;

the clamp assembly further including first and second rods respectively slidably received in the first and second passages.

9. A clamp assembly according to claim 8 wherein:
said second slots have a configuration generally corresponding to the configuration of outboard portions of said first land portions and a size slightly greater than the size of the outboard portions of said first land portions so that outboard portions of said first land portions of said first clamp half may be seated snugly in said second slots of said second clamp half; and said first slots have a configuration generally corresponding to the configuration of said second land portions and a size slightly grater than the size of said second land portions so that the second land portions of said first clamp half may be seated snugly in said first slots of said second clamp half.

10. A clamp assembly according to claim 9 wherein:
outboard portions of said first land portions of said first clamp half and the second land portions of said first clamp half are configured to underlie the respective rod and outboard portions of said first land portion of said second clamp half and the second land portions of said second clamp halves are configured to overlie the respective rod.

11. A clamp assembly according to claim 10 wherein:

the land portions have arcuate configurations and the rods have a circular cross section.

12. A method of forming a clamp assembly adapted to embrace a series of tubes to maintain the tubes in parallel spaced relation, the method comprises the steps of:

forming a pair of identical elongated clamp halves each having a series of axially spaced first slots opening in a first longitudinal side edge of the clamp half with a series of first axially spaced land portions positioned respectively therebetween and each having a series of second axially spaced slots opening in a second longitudinal side edge of the clamp half with a series of second axially spaced land portions positioned respectively therebetween;

rotating one of said clamp halves about its lengthwise axis through 180° with respect to the other clamp half;

moving the clamp halves together to position the first land portions of said one clamp half in the second slots of said other clamp half, position the second land portions of said other clamp half in the first slots of said other clamp half, position the first land portions of said other clamp half in the second slots of said one clamp half, position the second land portion of said other clamp half in the first slots of said one clamp half, and arrange the first and second slots in axially spaced pairs with each pair coacting to define an opening to pass a respective tube.

13. A method according to claim 12 wherein:

the first land portions of said one clamp half and the second land portions of said other clamp half coact to define a first passage extending axially along said first longitudinal side edge of the clamp assembly;

the first land portions of said other clamp half and the second land portions of said one clamp half coact to define a second passage extending axially along said second longitudinal side edge of the clamp assembly; and the method includes the further steps of, providing first and second rods, and inserting the first and second rods into the first and second passages.

14. A method according to claim 13 wherein:

the first land portions of each clamp half each define an inboard planar main body portion and a first outboard passage defining portion;

the second land portions of each clamp half each comprise a second outboard passage defining portion; and the step of moving the clamp halves together comprises positioning the planar main body portions of said one clamp half in superimposed relation with respect to the planar main body portions of said other clamp half with the first passage defining portions of said one clamp half coacting with the second passage defining portions of said other clamp half to define said first passage and the first passage defining portions of said other clamp half coacting with the second passage defining portions of said one clamp half to define said second passage.

15. A clamp assembly including a pair of elongated clamp halves adapted to coact to maintain a series of tubes in parallel spaced relation, characterized in that:

the clamp halves coact in their assembled relation to define a series of axially spaced openings to pass respective tubes and first and second passages extending axially along the respective sides of the assembled clamp halves;

the clamp assembly further includes first and second rods respectively received in said first and second passages;

the clamp halves are identical and are assembled with one clamp half inverted with respect to the other clamp half;

each clamp half includes a series of axially spaced planar main body portions separated by a series of first axially spaced slots opening in a first side edge of the clamp half;

in the assembled relation of the clamp halves, the planar main body portions of one clamp half are superimposed on the planar main body portions of the other clamp half and the first slots in one clamp half coact with the first slots in the other clamp half to define the openings for passage of the tubes; and each clamp half further includes a series of axially spaced first passage defining portions proximate said first side edge, raised above the plane of the planar main body portions, and formed as lateral extensions of the respective planar main body portions; a series of second axially spaced slots opening in a second side edge of the clamp half in respective lateral alignment with the planar main body portions; and a series of axially spaced second passage defining portions proximate said second side edge, raised above the plane of the planar main body portions, and disposed in respective lateral alignment with the first slots.

16. A claim assembly according to claim 15 wherein:

the clamp halves are assembled with one clamp half rotated about its lengthwise axis through 180° with respect to the other clamp half.

* * * * *